United States Patent
Eichinger (10) Patent No.: US 9,400,377 B2
(45) Date of Patent: Jul. 26, 2016

(54) AUTOMATIC FOCUSING METHOD FOR AN OPTICAL INSTRUMENT FOR MAGNIFIED VIEWING OF AN OBJECT

(75) Inventor: Markus Eichinger, Tuerkenfeld (DE)

(73) Assignee: Carl Zeiss Microscopy GmbH, Jena (DE)

( * ) Notice: Subject to any disclaimer, the term of this patent is extended or adjusted under 35 U.S.C. 154(b) by 1104 days.

(21) Appl. No.: 13/498,912

(22) PCT Filed: Sep. 13, 2010

(86) PCT No.: PCT/EP2010/063410
§ 371 (c)(1),
(2), (4) Date: Mar. 28, 2012

(87) PCT Pub. No.: WO2011/039049
PCT Pub. Date: Apr. 7, 2011

(65) Prior Publication Data
US 2012/0218460 A1  Aug. 30, 2012

(30) Foreign Application Priority Data

Sep. 29, 2009 (DE) .......................... 10 2009 045 107

(51) Int. Cl.
*G02B 21/36* (2006.01)
*G02B 21/24* (2006.01)
(Continued)

(52) U.S. Cl.
CPC ................ *G02B 21/244* (2013.01); *G02B 7/36* (2013.01); *G02B 27/0075* (2013.01)

(58) Field of Classification Search
CPC combination set(s) only.
See application file for complete search history.

(56) References Cited

U.S. PATENT DOCUMENTS

| 4,314,151 A | 2/1982 | Suzuki et al. |
| 4,342,905 A * | 8/1982 | Fujii .................. G02B 21/244 |
| | | 250/201.3 |

(Continued)

FOREIGN PATENT DOCUMENTS

| DE | 4226523 A1 | 2/1994 |
| DE | 69508248 T2 | 11/1999 |

(Continued)

OTHER PUBLICATIONS

Dähne et al., "A microscope focusing technique for a digital image analyzing system", Optik, Wissenschaftliche Verlagsgesellschaft mbH, Stuttgart, Germany, vol. 55, No. 4, May 1, 1980, pp. 437-448 (12 pages total).

(Continued)

*Primary Examiner* — Bumsuk Won
*Assistant Examiner* — Balram Parbadia
(74) *Attorney, Agent, or Firm* — Skaar Ulbrich Macari, P.A.

(57) ABSTRACT

A focusing method for an optical instrument for magnified viewing of an object includes producing at least two images with different focal positions and applying several different sharpness functions. Each function has an absolute extremum which specifies the optimum focal position to be set for the viewing and which lies in a close focus range of the sharpness function adjoined on both sides by a far focus range which contains local secondary extrema. For each of the at least two images an evaluation thereof is performed with the focal position as a variable such that a sharpness function variation direction of the focal position is calculated for each sharpness function in order to arrive at the optimum focal position. A determination is made for main variation direction based on all sharpness function variation directions, which is then used during further focusing.

13 Claims, 4 Drawing Sheets

(51) Int. Cl.
*G02B 27/00* (2006.01)
*G02B 7/36* (2006.01)

(56) References Cited

U.S. PATENT DOCUMENTS

| | | | | |
|---|---|---|---|---|
| 5,790,710 | A * | 8/1998 | Price et al. | 382/255 |
| 6,571,023 | B1 * | 5/2003 | Aizawa | G06T 1/0007 |
| | | | | 348/E5.028 |
| 7,254,262 | B2 | 8/2007 | Nehse et al. | |
| 2008/0002048 | A1 * | 1/2008 | Ito | G02B 7/365 |
| | | | | 348/345 |

FOREIGN PATENT DOCUMENTS

| | | |
|---|---|---|
| DE | 10018312 C2 | 10/2001 |
| DE | 102007003059 A1 | 7/2008 |
| EP | 0111635 A2 | 6/1984 |
| EP | 0769159 B1 | 3/1999 |
| FR | 2605751 A1 | 4/1988 |
| WO | 0075709 A1 | 12/2000 |
| WO | WO 0075709 A1 * | 12/2000 ........... G02B 21/244 |
| WO | 02084215 A1 | 10/2002 |
| WO | 2008087059 A1 | 7/2008 |

OTHER PUBLICATIONS

Groen et al., "A Comparison of Different Focus Functions for Use in Autofocus Algorithms", Cytometry 6:81-91, 1985, 11 pages.
Price et al., "Comparison of Phase-Contrast and Fluorescence Digital Autofocus for Scanning Microscopy", Cytometry 16:283-297, 1994, 15 pages.
Sun et al., "Autofocusing in Computer Microscopy: Selecting the Optimal Focus Algorithm", Microscopy Research and Technique 65:139-149, 2004 Wiley-Liss, Inc., 11 pages.
English Translation of German Office Action by the German Patent and Trademark Office for the German counterpart to the present application, dated May 3, 2010, 10 pages.
English Translation of International Preliminary Report on Patentability for PCT/EP2010/063410, dated Apr. 12, 2012, 7 pages.

* cited by examiner

AUTOMATIC FOCUSING METHOD FOR AN OPTICAL INSTRUMENT FOR MAGNIFIED VIEWING OF AN OBJECT

PRIORITY

This application claims the benefit of International Application PCT/EP2010/063410 filed on Sep. 13, 2010, and German Patent Application No. 102009045107.2-51, filed on Sep. 29, 2009, both of which are hereby incorporated herein by reference in their entirety.

FIELD

The present invention relates to a focussing method for an optical instrument for magnified viewing of an object, wherein the instrument has instrument optics, an adjusting unit for adjusting the focal position when viewing the object by means of the instrument optics as well as a recording unit which records the object by means of the instrument optics. Such an instrument is for example a microscope.

BACKGROUND

A sharpness function or a sharpness functional with the focal position as a variable is often applied to images with different focal positions for focussing. The sharpness functional then delivers a sharpness value for each focal position. Since it is not generally known beforehand how high the sharpness value is at the optimum focal position, a comparison with sharpness values at other focal positions is often carried out in order to ascertain the direction in which the focal position must be changed in order to arrive at the optimum focal position.

However, the problem is that at a greater distance of the focal position of the image, the sharpness functional often displays secondary maxima which can be caused by interferences during the recording or optical effects. Therefore, it may happen that such a secondary maximum is regarded as the optimum focal position, with the result that good focussing is not achieved.

SUMMARY

On this basis, the object of the invention is to provide a focussing method for an optical instrument for magnified viewing of an object, with which better focussing is possible.

According to the invention, the object is achieved by a focussing method for an optical instrument for magnified viewing of an object, wherein the instrument has instrument optics, an adjusting unit for adjusting the focal position when viewing the object by means of the instrument optics, as well as a recording unit which records the object by means of the instrument optics, and wherein the method comprises the following steps: a) producing at least two images with different focal positions, b) applying several different sharpness functions each of which has an absolute extremum which specifies the optimum focal position to be set for the viewing and which lies in a close focus range of the sharpness function adjoined on both sides by a far focus range which is more susceptible to interferences during recording than the close focus range and therefore contains local secondary extrema, in each case to each of the at least two images, and evaluation thereof with the focal position as a variable such that for each sharpness function a sharpness function variation direction of the focal position is calculated in order to arrive at the optimum focal position, c) determining a main variation direction based on all sharpness function variation directions, d) using the determined main variation direction during further focussing.

In particular, the focussing method according to the invention is developed as an automatic focussing method.

By using several different sharpness functions, a much better focussing is possible as it can be assumed that not every sharpness function delivers false sharpness function variation directions even if the at least two images lie in the far focus range of the respective sharpness function. As all sharpness function variation directions are taken into account when determining the main variation direction, there is a better decision basis for determining the correct main variation direction.

In particular, in step b) the sharpness function variation directions can be determined by means of a gradient calculation.

The respective sharpness function variation direction can thereby be determined quickly.

Further, in step c) the main variation direction can be determined by a majority decision or a weighted majority decision from among all sharpness function variation directions. This is easy to implement and results in a main variation direction which is very probably correct.

It can be ascertained in the method in step c), based on all sharpness function variation directions, whether the focal positions of the at least two images lie in the far focus range or in the close focus range, and this can be taken into account during further focussing.

It can easily be ascertained by this procedure whether the set focal position lies in the far focus range or in the close focus range, and the focussing can be adjusted thereto accordingly.

For example, it is possible to set the step size for changing the focal position for further images in the far focus range larger than in the close focus range. Thus on the one hand the focussing can be accelerated, as the close focus range is reached more quickly, and the optimum focal position thus also found more quickly. Further, a larger step size in the far focus range is advantageous as the undesired secondary maxima then have less influence when determining the sharpness function variation directions.

The step size can be determined for example according to the depth of field of the instrument optics. Thus, for example a step size in the range of from four times to six times the depth of field can be chosen in the far focus range. A step size of from half the depth of field to twice the depth of field can be chosen in the close focus range.

Further, it is possible to use different sharpness functions in the close focus range and far focus range. In particular, the number of sharpness functions in the close focus range can be smaller than in the far focus range.

The number of sharpness functions is preferably greater than 2, in particular 3, 4, 5 or even greater.

Further, if the far focus range is ascertained, detected extrema can be classified as secondary extrema and the main variation direction can be retained during focussing.

If it is recognized that one is in the close focus range, the focussing can be continued until it is established from the evaluation of the sharpness functions that an extremum has been exceeded. Using the then established sharpness function values, the position of the extremum can be ascertained in known manner. In particular, a parabolic fit or a fit of another suitable function can be carried out.

Further, it is possible to determine a weighted sharpness measure for each sharpness function from at least two or preferably at least three focal positions around the determined extremum. The weighted sharpness measures then serve as base points for a parabolic fit or a fit of another function in order to determine therefrom the exact position of the extremum.

Steps a)-c) can be repeated in order to thus ascertain the extremum (=optimum focal position).

When applying the sharpness functions, in each case the whole image can be considered or also predetermined subregions thereof.

Further, there is provided an optical instrument for magnified viewing of an object, with instrument optics, an adjusting unit for adjusting the focal position when viewing the object by means of the instrument optics, a recording unit which records the object by means of the instrument optics, and an evaluation and control unit, A) to which at least two images with different focal positions are fed B) which applies several different sharpness functions each of which has an absolute extremum which specifies the optimum focal position to be set for the viewing and which lies in a close focus range of the sharpness function adjoined on both sides by a far focus range which is more susceptible to interferences during recording than the close focus range and therefore contains local secondary extrema, in each case to each of the at least two images, and evaluates them with the focal position as a variable such that for each sharpness function a sharpness function variation direction of the focal position is calculated in order to arrive at the optimum focal position C) which determines a main variation direction based on all sharpness function variation directions and D) which uses the determined main variation direction during further focussing.

Focussing, in particular automatic focussing, can be carried out reliably with this optical instrument.

The optical instrument can in particular be developed such that the focussing method according to the invention as well as its developments can be carried out.

The optical instrument can in particular be a telescope or a microscope. The microscope can be formed as a fluorescence microscope, as a multichannel fluorescence microscope, as a phase-contrast microscope or any other microscope. The recording unit can comprise a camera, e.g. a CCD camera. However, it is also possible for the recording unit to be formed as a point scanner (point imaging) or line scanner. In this case, the microscope is preferably a laser scanning microscope. The evaluation and control unit can be realized by the control unit of the microscope itself or formed at least partly as a separate unit. The object to be viewed can be in particular medical and/or biological specimens.

It is understood that the features mentioned above and those yet to be explained below can be used, not only in the stated combinations, but also in other combinations or alone, without departing from the scope of the present invention.

The invention is explained in further detail below by way of example using the attached drawings which also disclose features essential to the invention. There are shown in.

BRIEF DESCRIPTION OF THE DRAWINGS

DETAILED DESCRIPTION

Figure 1:
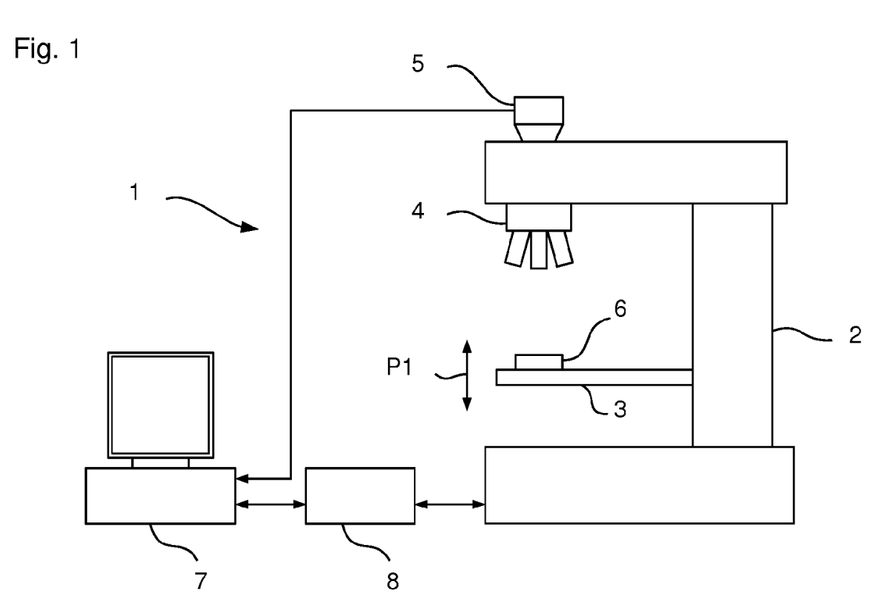
FIG. 1 a schematic representation of an embodiment of the optical instrument according to the invention.

In the embodiment shown in FIG. 1, the optical instrument 1 according to the invention is formed as a microscope and comprises a stand 2 with a specimen stage 3 as well as a microscope lens system 4 for which an objective nosepiece with three objectives is drawn in schematically. The distance between microscope objective 4 (objective nosepiece) and specimen stage 3 can be changed to adjust the focal position or for focussing (z position), as indicated by the double arrow P1 in FIG. 1.

The microscope 1 further comprises a recording unit 5 (for example a CCD camera) with which the magnified picture of a specimen 6 to be examined can be recorded. The recording unit 5 is connected to a schematically represented computer 7 which controls the microscope 1 via a control module 8 during operation.

To carry out automatic focussing, the specimen 6 to be examined is first recorded in two different focal positions and the images are fed to the computer 7. The computer 7 applies several different sharpness functions or sharpness functionals S1, S2 and S3 to each image in order to carry out the automatic focussing using the calculated sharpness functional values, as described below in detail. The computer 7 together with the control module 8 forms an evaluation and control unit.

The sharpness functionals S deliver a scalar sharpness measure, as, in the calculation rule of the respective sharpness functional, summation or integration is carried out over the two image dimensions of the two-dimensional image. For a given picture section, the scalar sharpness measure therefore depends essentially only on z (focal position).

The sharpness functionals used here have a maximum as absolute extremum and should display the following properties for the automatic focussing. The functional should display the maximum at the z position which corresponds visually to the sharpest setting (precision). The functional should further display a clear maximum for a given picture section (unimodality). The immediate vicinity of the maximum should be such that the extreme value can easily be ascertained (reproducibility). The functional should further be such that even in z positions that are far removed from the focus (optimum focal position), the z direction in which the images become sharper can clearly be ascertained (catchment area). The functional should be able to be used for as large as possible a class of picture contents and recording techniques (general applicability). Finally, the functional should be as resistant as possible to interferences (e.g. fluctuations in lighting or change in the picture content) (robustness).

Figure 2:
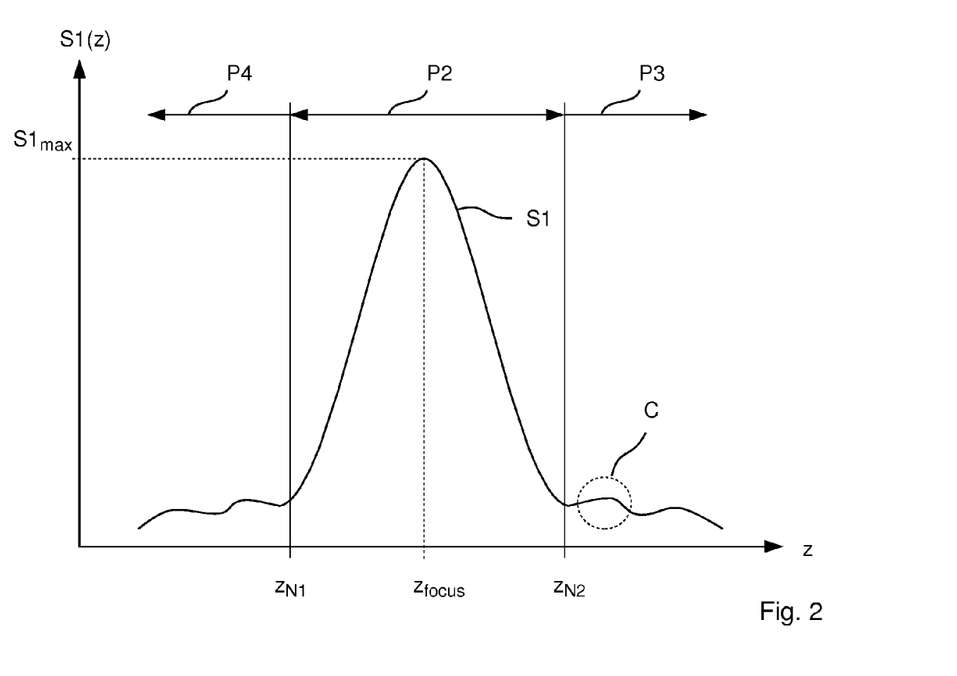
FIG. 2 a schematic representation of the actual profile of a first sharpness functional S1.

The actual profile of the first sharpness functional S1 is shown schematically in FIG. 2. This profile can be divided into two sections.

There is a section (double arrow P2) in which the first sharpness functional S1(z) increases or decreases monotonically relative to the main maximum ($S1_{max}$) and which contains the main or sharpness maximum $S1_{max}$. In this section, which covers z values (=focal positions) from $z_{N1}$ to $z_{N2}$ and which is called close focus range below, the need for precision, unimodality, reproducibility, generality and robustness is fully satisfied.

Sections, which together are called far focus range below, adjoin the close focus range on both sides (arrows P3 and P4; z values less than $z_{N1}$ or greater than $z_{N2}$). This far focus range is sensitive to interferences and there are local secondary maxima, as is shown schematically in the representation in FIG. 2. This makes focussing difficult in particular if the first two images are recorded in the far focus range for automatic focussing.

Figure 3:
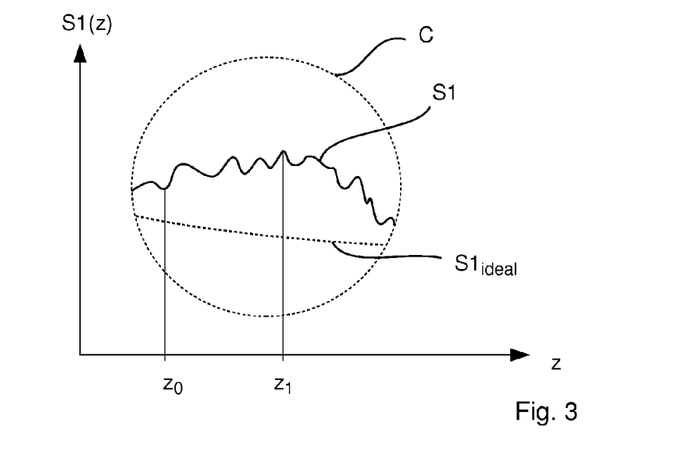
FIG. 3 an enlarged representation of detail C from FIG. 2.

The ideal profile of the sharpness functional S1 is shown as a dotted line in FIG. 3 and labelled $S1_{ideal}$. However, this ideal profile is not actually achieved as e.g. in the far focus range the condition for unimodality is not satisfied and the secondary maxima shown occur. The reasons for this are interferences such as for example fluctuations in lighting, the thickness of the specimen, dirt particles from other z planes and/or camera noise. In the close focus range, the same interferences occur in principle, but the slope of the sharpness functional in the close focus range is so steep that the interferences are of no consequence. The signal-to-noise ratio in the close focus range is thus much better than in the far focus range.

Further, there is in principle the difficulty that there is no sharpness functional which delivers an absolute value, which is independent of the picture content, for the picture sharpness. The sharpness value delivered by a sharpness functional thus depends as a rule on the picture content, in particular for example on the image brightness.

Thus in general the following situation applies. If the sharpness value $S1_0=S1(z_0)$ is calculated in the start position $z_0$, there is no indication whether one is in the far focus range, in the close focus range or even in the actual focus. In general, there is also no indication about how high the value $S1_{max}$ is at the focal position $z_{focus}$. Only through a comparison with sharpness values $S1(z_i)$ at other z positions $z_i$ can it be ascertained whether one is in the focus or in which z direction the specimen 6 or the microscope lens system 4 must move in order to come closer to the focal point.

The depth of field of the microscope lens system 4 can be regarded as a natural measure of the z step size. If the step size is chosen much smaller than the depth of field T, a large number of steps is required to reach the maximum. Moreover, there is a risk particularly in the far focus range of obtaining a smaller secondary maximum for the optimum main maximum. If the step size is chosen much larger than the depth of field, there is a risk of exceeding the optimum main maximum. In addition, there is a risk, where step sizes are too large, of the specimen 6 and the microscope lens system 4 colliding if the search is not convergent. Typically, a step size K is chosen to explore the sharpness landscape in the range of from 0.5 T to 2 T.

With the gradient ascent procedure used here, it is attempted, starting from the start position (which is labelled $z_0$ in FIG. 3 in the enlarged representation of detail C from FIG. 2) to discover the z direction in which the picture becomes sharper. For this purpose, the scalar sharpness value of the first sharpness functional S1 is calculated for the first image at $z_o$ (first focal position) and for the second image at $z_1$ (second focal position) respectively, and the slope determined based on the sharpness values and the distance between $z_0$ and $z_1$. The thus determined slope should specify the direction in which the absolute maximum of the sharpness functional S1 lies.

As is clear from the representation in FIG. 3, however, a rise from left to right is ascertained, with the result that the main maximum would be sought in the direction of larger z values, but this is the wrong direction.

In the close focus range, a gradient ascertained in the same manner would not point in the wrong direction, as the interferences are too slight compared with the slope of the sharpness functional in the close focus range. With the gradient method used here it is thus essential to establish whether one is in the close or far focus range. If one is in the far focus range, it must be ensured that the main maximum is sought in the right direction. This is achieved according to the invention as follows.

In the case of the microscope according to the invention, the computer 7 applies not only the first sharpness functional S1 but, as already mentioned, a group of several sharpness functionals (here the three sharpness functionals S1, S2, S3) to each image, with the result that a tuple M of sharpness measures S1(z), S2(z), S3(z) is obtained for each image. By calculating the sharpness measures at two z positions, a gradient $Gi(z)=Si(z_1)-Si(z_0)/(z_1-z_0)$ can be calculated (with i=1, 2, 3) for each z position and for each functional S1, S2, S3. The sign of each gradient Gi specifies the z direction (sharpness function variation direction) in which the main maximum lies if unimodality of the sharpness functionals S1, S2, S3 could be assumed.

Figure 4:
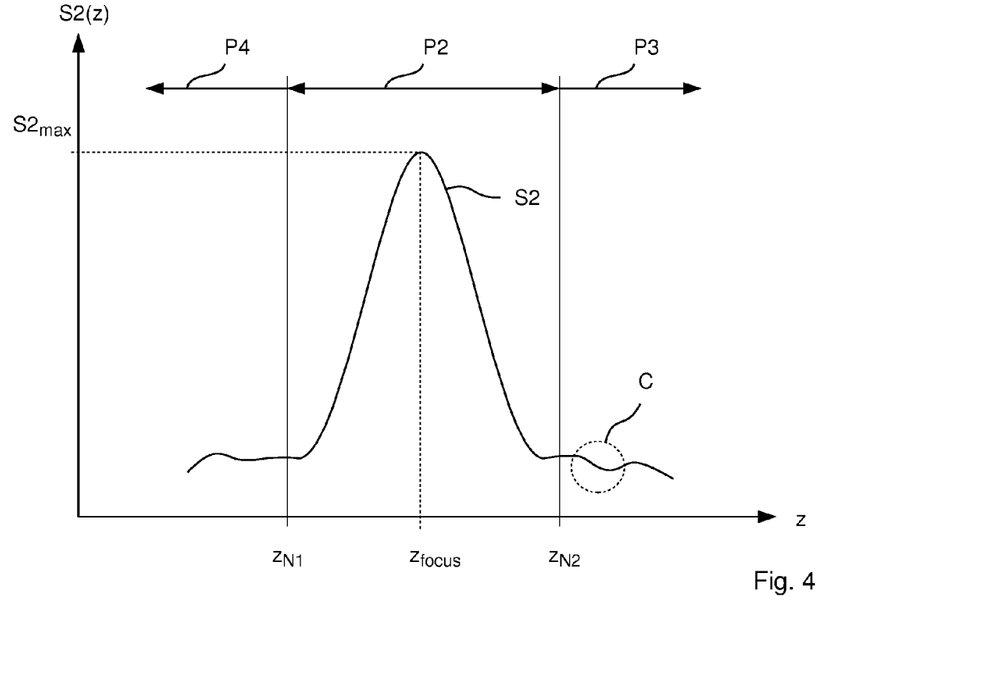
FIG. 4 a schematic representation of the actual profile of a second sharpness functional S2.
Figure 5:
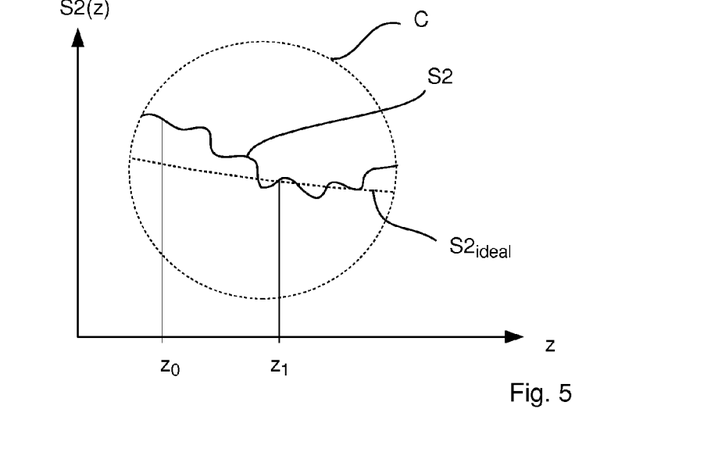
FIG. 5 an enlarged view of detail C from FIG. 4.
Figure 6:
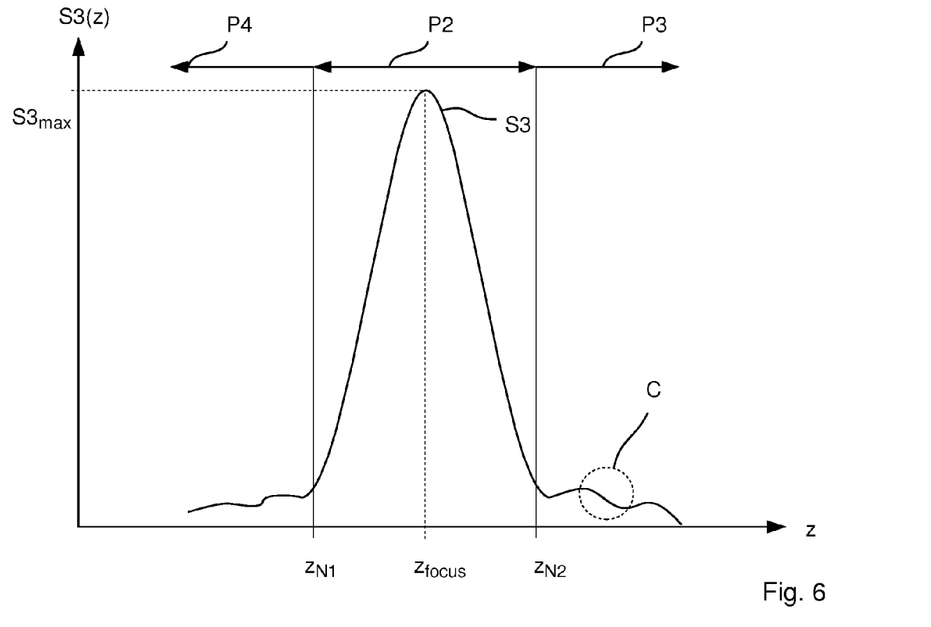
FIG. 6 a schematic representation of the actual profile of a third sharpness functional S3.
Figure 7:
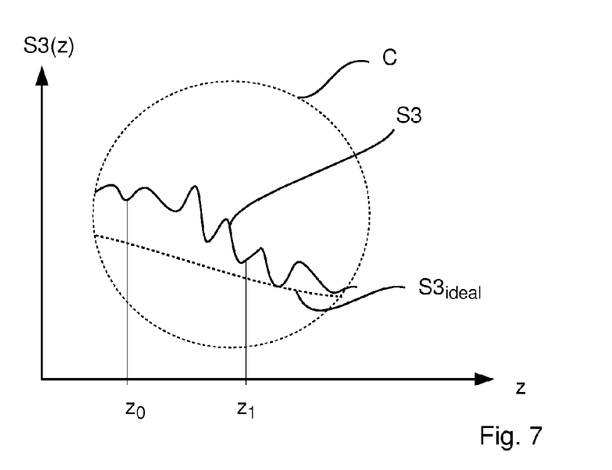
FIG. 7 an enlarged view of detail C from FIG. 6.

However, since this is not always the case in the far focus range, as already stated, according to the invention the direction in which most gradients Gi of the sharpness measures of the tuple M point is chosen. Thus a majority decision is made and a much improved decision basis for the direction (main variation direction) in which the focal position lies is obtained. In FIGS. 4 and 5 as well as 6 and 7, in each case sharpness functionals S2 and S3 are shown schematically in the same way as in FIGS. 2 and 3. As can be seen from the representations (in particular FIGS. 3, 5 and 7), the gradient G1 points in the wrong direction and the gradients G2 and G3 point in the right direction, with the result that the correct direction for focussing is chosen with the majority decision described.

If the direction is determined in this manner, the focal position is modified by the determined step size K and a further image is generated. The direction is then determined again. If all gradients point in the same direction (e.g. x times in succession for x changes of the focal position), it can be assumed that one is in the close focus range. Once the direction of all the gradients changes when there are further changes of the focal position, it can be assumed that the absolute maximum has been exceeded. Thus the position of the absolute maximum (optimum focal position) can be determined.

The sharpness functionals in the tuple M can be of one class, e.g. Brenner gradients for different linear scales. However, the sharpness functionals in the tuple M can also belong to completely different classes, for example functionals based on gradient methods, spectral methods, autocorrelation methods, empirical methods, etc. If a colour image (e.g. RGB channels) or a multichannel image is present as database, then a sharpness measure can be defined separately for each channel via a sharpness functional and added to the tuple.

Not only can it be determined from the viewing of the gradients for the sharpness functionals in the tuple M in which direction the focal point lies, but, as already mentioned, it can also be deduced whether one is in the close focus range or in the far focus range. Thus for example it can be established that one is in the close focus range if all the gradients Gi point in the same direction. If not all gradients Gi point in the same direction, it can be assumed that one is in the far focus range.

Naturally, it is also possible to weight the gradients when deciding. Thus for example the following weighting can be carried out $$G = \sum_i (Wi \cdot Di)$$

wherein Wi is the normalized weighting of the i-th functional and Di is the direction which results from the viewing of the gradient Gi of the i-th functional and assumes either the value −1 or 1. By comparison with a threshold value H, it can then be decided whether one is in the close focus range or in the far focus range. The closer G is to −1 or 1, the more certain it is that one is in the close focus range. Values close to 0 mean there is no agreement, and consequently this points to the far focus range. Thus it can be said that one is in the close focus range if G is greater than H. If G is less than or equal to H, one is in the far focus range.

In the case of the microscope according to the invention, the step size for adjusting the optimum focus can be varied. When it is established by the above procedure that one is in the far focus range, the step size can be increased. Thus the optimum focal position can be reached with fewer steps. A larger step size for the far focus range further results in the advantage that, in the case of a larger step size, the influence of the interferences during gradient calculation is less and the autofocus algorithm thus more robust. Once it is recognized that one is in the close focus range, the step size can be reduced such that a reliable detection of the main maximum can be ensured.

When it is recognized from the viewing of the gradients that one is in the far focus range, the detected maxima can be classified as secondary maxima and the gradient ascent is not interrupted.

Once it is recognized that one is in the close focus range, the gradient ascent, as already mentioned, is continued until the maximum has been exceeded. The sharpness values of the last three steps can be used to ascertain an exact position of the focal position via a parabolic fit or a fit of another suitable function. This calculation can be carried out for each functional in the tuple and the ascertained focal positions can be averaged or weight-averaged. Naturally, it is also possible to no longer use all sharpness functionals of the tuple M in the close focus range. In particular it is also possible to use one additional or only at least one additional sharpness functional.

For example, the following effective sharpness measure can be calculated from the functional tuple M for the last three positions $z_1$, $z_2$ and $z_3$ around the maximum $$S_{\mathit{eff}}(z_i) = \sum_j \left( Wj \cdot Sj(z_j) \Big/ \sum_k Wk \right)$$

with j=1, 2 and 3 as well as k=1, 2 and 3. For these three base points $S_{\mathit{eff}}(z_i)$ the maximum position, which is taken as the optimum focal position, can then be ascertained via a parabolic fit (or a fit of another function).

The weights Wk chosen for the calculation of the focal position can be different from the weights Wi in the far focus range. In the far focus range, the functions which are more informative in this range can thereby be weighted higher. In the close focus range, the functions which have favourable properties particularly in respect of precision and reproducibility can be weighted higher.

The described calculations of the sharpness measures can be carried out in each case on the whole image or in sub-regions of any desired shape of the image. The sub-regions can be predetermined or a separate algorithm can be used to establish the sub-regions.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method of focusing an optical instrument for magnified viewing of an object, the optical instrument comprising instrument optics, an adjusting unit for adjusting the focal position when viewing the object by means of the instrument optics, and a recording unit which records the object by means of the instrument optics, the method comprising the steps of:
   a) producing at least two images with different focal positions;
   b) applying several different sharpness functions to each of the at least two images, each of the several different sharpness functions having an absolute extremum which specifies the optimum focal position to be set for the viewing and which lies in a close focus range of the sharpness function adjoined on both sides by a far focus range which is more susceptible to interferences during recording than the close focus range and therefore contains local secondary extrema, with the focal position as a variable such that a sharpness function variation direction of the focal position is calculated for each sharpness function in order to arrive at the optimum focal position;
   c) determining a main variation direction by simultaneously utilizing together all sharpness function variation directions such that the main variation direction is calculated based on all of the sharpness function variation directions; and
   d) using the determined main variation direction during further focusing.

2. The method according to claim 1, wherein the sharpness function variation direction in step b) is determined by means of a gradient calculation.

3. The method according to claim 2, wherein, in step c) the main variation direction is determined by a majority decision or a weighted majority decision from among all sharpness function variation directions.

4. The method according to claim 3, wherein, in step c) it is ascertained, based on all sharpness function variation directions, whether the focal positions of the at least two images lie in one of the far focus range and in the close focus range, and this is taken into account during further focusing.

5. The method according to claim 4, wherein, during further focusing, the step size for changing the focal position for further images is set higher if the far focus range has been ascertained compared with the case where the close focus range has been ascertained.

6. The method according to claim 2, wherein, in step c) it is ascertained, based on all sharpness function variation directions, whether the focal positions of the at least two images lie in the far focus range or in the close focus range, and this is taken into account during further focusing.

7. The method according to claim 6, wherein, during further focusing, the step size for changing the focal position for further images is set higher if the far focus range has been ascertained compared with the case where the close focus range has been ascertained.

8. The method according to claim 1, wherein, in step c) the main variation direction is determined by one of a majority decision and a weighted majority decision from among all sharpness function variation directions.

9. The method according to claim 8, wherein, in step c) it is ascertained, based on all sharpness function variation directions, whether the focal positions of the at least two images lie in one of the far focus range and in the close focus range, and this is taken into account during further focusing.

10. The method according to claim 9, wherein, during further focusing, the step size for changing the focal position for further images is set higher if the far focus range has been ascertained compared with the case where the close focus range has been ascertained.

11. The method according to claim 1, wherein, in step c) it is ascertained, based on all sharpness function variation directions, whether the focal positions of the at least two images lie in one of the far focus range and in the close focus range, and this is taken into account during further focusing.

12. The method according to claim 11, wherein, during further focusing, the step size for changing the focal position for further images is set higher if the far focus range has been ascertained compared with the case where the close focus range has been ascertained.

13. An optical instrument for magnified viewing of an object, comprising:
    instrument optics;
    an adjusting unit for adjusting the focal position when viewing the object by means of the instrument optics,
    a recording unit which records the object by means of the instrument optics; and
    an evaluation and control unit, the evaluation and control unit configured:
        to be fed at least two images with different focal positions;
        to apply several different sharpness functions to each of the at least two images, each of the several different sharpness functions having an absolute extremum which specifies the optimum focal position to be set for the viewing and which lies in a close focus range of the sharpness function adjoined on both sides by a far focus range which is more susceptible to interferences during recording than the close focus range and therefore contains local secondary extrema, in each case to each of the at least two images, and evaluate them with the focal position as a variable such that for each sharpness function a sharpness function variation direction of the focal position is calculated in order to arrive at the optimum focal position;
        to determine a main variation direction by simultaneously utilizing together all sharpness function variation directions such that the main variation direction is calculated based on all of the sharpness function variation directions; and
        to use the determined main variation direction during further focusing.

* * * * *